US012371344B1

United States Patent
Ali et al.

(10) Patent No.: US 12,371,344 B1
(45) Date of Patent: Jul. 29, 2025

(54) FERRIC OXIDE NANOPARTICLES FOR WASTEWATER DISINFECTION

(71) Applicant: KING FAISAL UNIVERSITY, Al-Ahsa (SA)

(72) Inventors: Mai Mostafa Khalaf Ali, Al-Ahsa (SA); Hany Mohamed Abd El-Lateef Ahmed, Al-Ahsa (SA); Mohamed Gouda, Al-Ahsa (SA); Fatima Essa Al Rasheed, Al-Ahsa (SA); Mohammed Abbas Alsaeed, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/977,311

(22) Filed: Dec. 11, 2024

(51) Int. Cl.
  *C01G 49/06* (2006.01)
  *C02F 1/68* (2023.01)

(52) U.S. Cl.
  CPC ............... *C01G 49/06* (2013.01); *C02F 1/68* (2013.01); *C01P 2002/01* (2013.01); *C01P 2002/72* (2013.01); *C01P 2002/84* (2013.01); *C01P 2004/03* (2013.01); *C01P 2004/04* (2013.01); *C01P 2004/51* (2013.01); *C01P 2004/64* (2013.01); *C02F 2303/04* (2013.01); *C02F 2303/20* (2013.01); *C02F 2305/08* (2013.01)

(58) Field of Classification Search
  CPC .................. C01G 49/06; C01F 1/68
  See application file for complete search history.

(56) References Cited

FOREIGN PATENT DOCUMENTS

IN 202411040955 A 6/2024

OTHER PUBLICATIONS

Herlekar, M., et al., "Biological Synthesis of Iron Oxide Nanoparticles Using Agro-Wastes and Feasibility for Municipal Wastewater Treatment" Conference Paper, Jan. 2015.
Sebastian, A., et al., "Green Synthesis of Iron Nanoparticles From Selected Plant Materials of Peninsular India"; Proceedings of the National Academy of Sciences, India Section A: Physical Sciences, 88: pp. 195-203 Sep. 19, 2017. Abstract.
Younis, I. Y., et al., "Green Synthesis of Magnesium Nanoparticles Mediated From Rosa Floribunda Charisma Extract and Its Antioxidant, Antiaging and Antibiofilm Activities"; Scientific Reports, 11:16868 Aug. 19, 2021.
Xie, J., et al., "Chemical Compounds, Anti-Aging and Antibacterial Properties of Rosa Rugosa Purple Branch"; Industrial Crops and Products, 181:114814, Jul. 2022.
Dubey, S. P., et al., "Green Synthesis and Characterizations of Silver and Gold Nanoparticles Using"; Colloids and Surfaces A: Physicochemical and Engineering Aspects, 364(1-3): pp. 34-41, Jul. 2010. Abstract.

*Primary Examiner* — James A Fiorito
(74) *Attorney, Agent, or Firm* — Nath, Goldberg & Meyer; Joshua B. Goldberg

(57) ABSTRACT

A method of making a ferric oxide ($Fe_2O_3$) nanoparticle (NP) composition including providing *Rosa rugosa* cv. *plena* (RP) extract; adding the RP extract to a solution of $FeCl_3$ to obtain RP-$Fe_3Cl_4$; and activating phytochemical compounds in the RP extract to obtain a phyto-synthesized RP-$Fe_2O_3$ NP composition.

5 Claims, 15 Drawing Sheets

FERRIC OXIDE NANOPARTICLES FOR WASTEWATER DISINFECTION

BACKGROUND

1. Field

The present disclosure relates to treatments for wastewater disinfection, and particularly, to ferric oxide nanoparticles.

2. Description of the Related Art

The serious health dangers associated with waterborne microorganisms have prompted research into substitute disinfectants.

The rapidly developing area of nanotechnology, which focuses on breakthroughs at the nanoscale level, offers a wide range of applications in a number of industries, including food, agriculture, the environment, water treatment, and medical. This field has enormous potential to improve gadgets, materials, and systems by giving them new qualities that have the ability to completely transform a variety of sectors.

Currently under threat from the fast-moving industrialization and growing population, water is the most important, yet finite resource on Earth. Contamination has resulted from a surge in the release of pathogenic bacteria, pesticides, heavy metals, and a variety of organic and inorganic chemicals. The issues posed by traditional treatment methods are exacerbated by these pollutants, which pose complex implications for human health and the environment. Oil spills in agricultural systems, sewage, industrial wastewater, and incorrect pesticide, fertilizer, and fertilizer applications are among the main offenders accountable for contaminating water and soil. The enormous amounts of wastewater produced as a result of industrial growth and population growth pose a serious danger to the sustainability of the environment worldwide. Physical, chemical, and/or biological processes are often used in conventional wastewater treatment systems to remove particles such colloids, soluble pollutants (metals, organics, etc.), organic matter, and nutrients. Disinfection stands as a pivotal process within treatment protocols, effectively halting the transmission of aquatic pathogens. Nevertheless, the utilization of traditional disinfectants, notably chlorine, poses several drawbacks due to its propensity to react with organic molecules. This reaction often leads to the production of carcinogenic compounds, underscoring the critical significance of addressing these inherent issues associated with conventional disinfection methods.

Thus, a wastewater treatment method solving the aforementioned problems is desired.

SUMMARY

The present subject matter relates to ferric oxide nanoparticles ($Fe_2O_3$ NPs) that can be produced in an environmentally friendly manner using *Rosa rugosa* flower extract. The nanoparticles exhibit antibacterial activities. In an embodiment, the nanoparticles exhibit antibacterial activities against one or more bacteria selected from the group consisting of *Escherichia coli*, *Klebsiella pneumoniae*, *Bacillus subtilis*, and *Listeria monocytogenes*.

An embodiment of the present subject matter is directed to a method of making a ferric oxide ($Fe_2O_3$) nanoparticle (NP) composition. The method may include providing *Rosa rugosa* cv. *plena* (RP) extract; adding the RP extract to a solution of $FeCl_3$ to obtain an RP-$Fe_3Cl_4$ solution; activating phytochemical compounds in the RP extract to obtain a phyto-synthesized RP-$Fe_2O_3$ NP composition.

An embodiment of the present subject matter is directed to a *Rosa rugosa* cv. *plena* (RP) ferric oxide ($Fe_2O_3$) nanoparticle composition prepared according to the method described herein.

An embodiment of the present subject matter is directed to a method of disinfecting water. The method may include contacting a water sample with a *Rosa rugosa* cv. *plena* (RP) ferric oxide nanoparticle composition.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
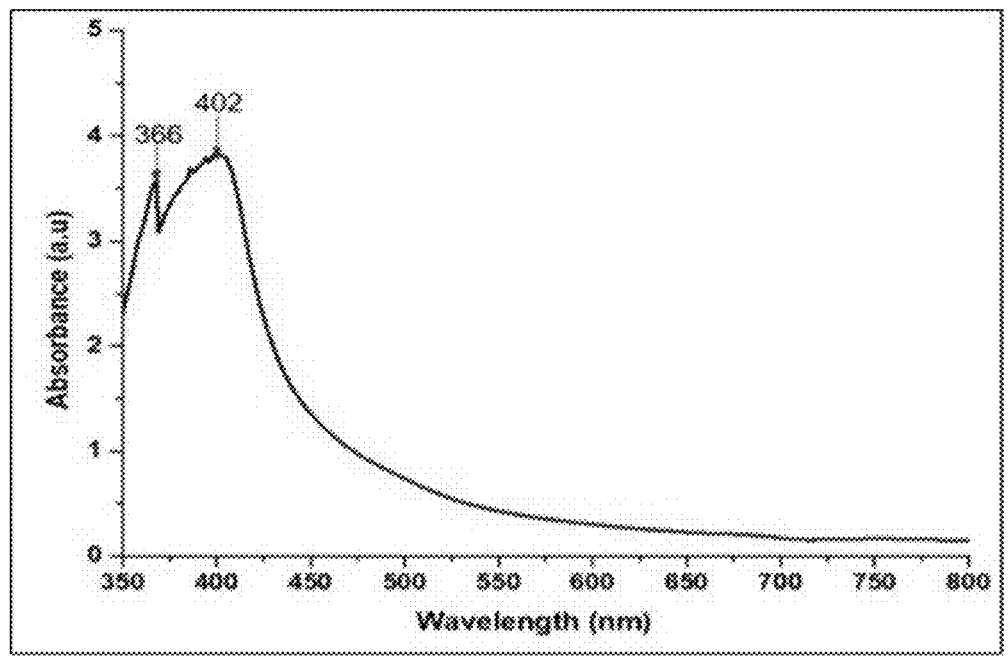
FIG. 1 shows a UV-Vis spectra of $Fe_2O_3$ nanoparticles (NPs).

The following definitions are provided for the purpose of understanding the present subject matter and for construing the appended patent claims.

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Figure 6A:
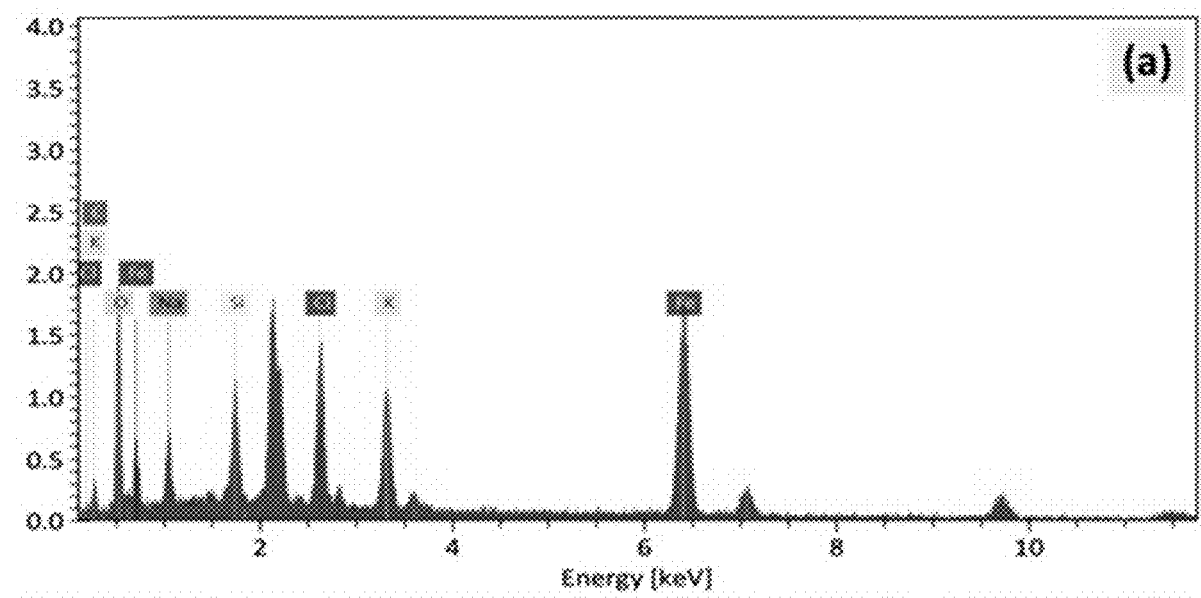
FIG. 6A is a graph of energy-dispersive X-ray spectroscopy (XRD) results of $Fe_2O_3$ NPs.

The present subject matter relates to ferric oxide nanoparticles ($Fe_2O_3$ NPs) capped with *Rosa rugosa* cv. *plena* (RP) extract or a ferric oxide ($Fe_2O_3$) nanoparticle (NP) composition. The ferric oxide nanoparticles can be produced in an environmentally friendly manner using *Rosa rugosa* flower extract. The nanoparticles exhibit antibacterial activities. In an embodiment, the nanoparticles exhibit antibacterial activities against *Escherichia coli*, *Klebsiella pneumoniae*, *Bacillus subtilis*, and *Listeria monocytogenes*. The synthesized $Fe_2O_3$ NPs were characterized via several techniques, including but not limited to, Zeta potential (FIG. 4B), particle size (FIG. 4A), Fourier transform infrared (FTIR) spectroscopy, X-ray diffraction (XRD), scanning electron microscope (SEM) (FIGS. 5A-5D), and energy-dispersive X-ray spectroscopy (EDX) (FIG. 6A).

An embodiment of the present subject matter is directed to a method of making a ferric oxide ($Fe_2O_3$) nanoparticle (NP) composition. The method may include providing *Rosa rugosa* cv. *plena* (RP) extract; adding the RP extract to a solution of $FeCl_3$ to obtain a RP-$Fe_3Cl_4$ solution; activating phytochemical compounds in the RP extract to obtain phyto-synthesized $Fe_2O_3$ NPs in the $Fe_3Cl_4$ solution. The method may further include centrifuging the solution including phyto-synthesized $Fe_2O_3$ NPs to provide an RP-$Fe_2O_3$ NP composition. In an embodiment, the solution including phyto-synthesized $Fe_2O_3$ NPs can be centrifuged for about 15 minutes at about 10,000 rpm to provide an RP-$Fe_2O_3$ NP composition. After centrifuging, the RP-$Fe_2O_3$ NP composition can be formed into a powder by dessicating the RP-$Fe_2O_3$ NP composition to obtain pulverized $Fe_2O_3$ NPs. The method may include drying the RP-$Fe_2O_3$ NP composition; calcinating the RP-$Fe_2O_3$ NP composition; and reducing the RP-$Fe_2O_3$ NP composition to a fine powder. In an embodiment, the RP-$Fe_2O_3$ NP composition can be desiccated at about 60° C. for about 6 hours to obtain pulverized $Fe_2O_3$ NPs.

In another embodiment, about 20 mL of RP extract may be added dropwise to about 80 mL of the solution of $FeCl_3$.

In certain embodiments, activating the phytochemical compounds in the RP extract comprises agitating the RP-$Fe_3Cl_4$ solution in a shaking water bath at about 60° C. at about 160 rpm for about 4 hours.

In other embodiments, the phyto-synthesized $Fe_2O_3$ NPs may be a brown color, such as a blackish brown color.

An embodiment of the present subject matter is directed to ferric oxide nanoparticles ($Fe_2O_3$ NPs) capped with *Rosa rugosa* cv. *plena* (RP) extract or a *Rosa rugosa* cv. *plena* (RP) ferric oxide nanoparticle composition (RP-$Fe_2O_3$). The $Fe_2O_3$ NPs can be prepared according to an implementation of the method described herein. In an embodiment, the $Fe_2O_3$ NPs have a particle size ranging from about 60 nm to about 73 nm, e.g., about 67.77 nm.

An embodiment of the present subject matter is directed to a method of disinfecting water. The method may include contacting a water sample with a ferric oxide nanoparticle composition as described herein. In an embodiment, once the ferric oxide nanoparticle composition is contacted with the water sample, the infectious material can be removed from the water sample. In certain embodiments, the infectious material may be eradicated after 100 minutes of contact.

In further embodiments, the infectious material may be selected from the group consisting of bacterial pathogens. In an embodiment, the bacterial pathogens may be a Gram-positive species. The Gram-positive species may be selected from the group consisting of *Bacillus subtilis* and *Listeria monocytogenes*. When the Gram-positive species is *L. monocytogenes*, the method may provide MIC and MBC values of about 250±15.6 and about 500±18.5 g/mL, respectively.

In other embodiments, the bacterial pathogens may be a Gram-negative species. By non-limiting example, the Gram-negative species may be selected from the group consisting of *Escherichia coli* and *Klebsiella pneumoniae*. When the Gram-negative species is *E. Coli*, the method may provide MIC and MBC values of 62.5±8.3 and 125±9.35 μg/mL, respectively.

An embodiment of the present subject matter is directed to a method of preventing development of biofilm in water. The method may include contacting the water with the ferric oxide NP composition as described herein.

The ferric oxide nanoparticle composition for wastewater disinfection may be better understood in view of the following examples.

EXAMPLES

Materials

Analytical-grade ferric chloride ($FeCl_3$) was procured from Sigma-Aldrich, UK, and employed in the synthesis procedures without additional purification. The chloride was dissolved in deionized (DI) water. *Rosa rugosa* cv. *plena* (RP) flowers were obtained from a gardening plantation located in the Kingdom of Saudi Arabia (KSA).

Example 1

Extraction Procedure of *Rosa rugosa* cv. *plena* (RP) Flower

The extraction process of *Rosa rugosa* cv. *plena* (RP) flowers involved several steps for obtaining a solution rich in bioactive compounds. Initially, freshly collected RP flowers were meticulously sorted by hand and subsequently dried at room temperature for a week to remove moisture content. Once thoroughly dried, the flowers were finely ground to a powder-like consistency.

For the extraction, 10 g of the prepared RP powder was mixed with 100 mL of deionized (DI) water in an Erlenmeyer flask. This mixture was then heated to 80° C. and stirred using a magnetic stirrer at a speed of 200 rpm for 60 minutes. This heating and stirring process facilitated the release and dissolution of bioactive compounds from the RP powder into the water. After the extraction period, the heated RP solution was allowed to cool naturally for 3 hours. Subsequently, the solution underwent filtration to remove any solid residues. Initially, cotton wool was used as a preliminary filter, followed by a more refined filtration step using a nylon filter. This filtration process was employed to obtain a clarified solution rich in bioactive components derived from the RP flowers.

Example 2

Phyto-Synthesis of $Fe_2O_3$ NPs

The phyto-synthesis of $Fe_2O_3$ NPs utilizing RP extract as the bio-reducing agent was conducted by an amended procedure. In the beginning, a 0.1 M solution of iron(III) chloride ($FeCl_3$) was prepared by agitating $FeCl_3$ in 100 mL of DI water for approximately 15 minutes. Following that, an increment of 20 mL of RP extract was slowly added dropwise to 80 mL of the 0.1 M $FeCl_3$ solution, resulting in the formation of the RP-$Fe_3Cl_4$ solution. In order to activate the phytochemical compounds in the extract, the solution was agitated in a shaking water bath at 60° C. and 150 rpm for 4 hours. The generation of phyto-synthesized $Fe_2O_3$ NPs was determined during this time when the solution changed to a brownish-black solution. The mixture underwent 15 minutes of centrifugation at 10,000 rpm, which produced particles containing the RP-$Fe_2O_3$ NPs. Following this, the NPs were desiccated at 60° C. for 6 hours. After the pulverized $Fe_2O_3$ NPs were dried, they were subjected to a calcination procedure lasting 4 hours at 400° C. Following the calcination process, the resultant $Fe_2O_3$ NPs were systematically reduced to a fine powder consistency by employing a mortar and pestle.

Characterization

Figure 3A:
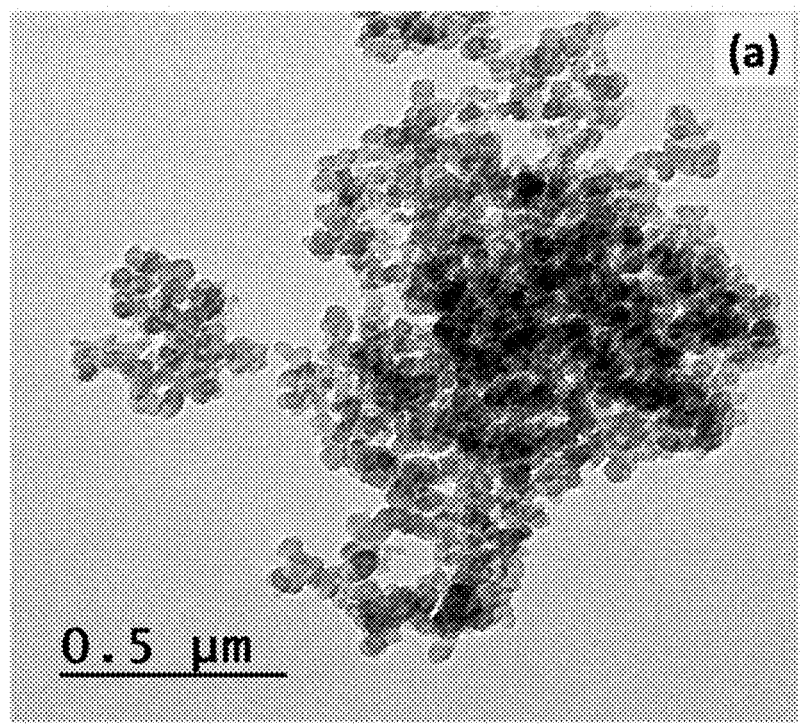
FIG. 3A shows a transmission electron microscopy (TEM) of $Fe_2O_3$ NPs at 0.5 μm.
Figure 3B:
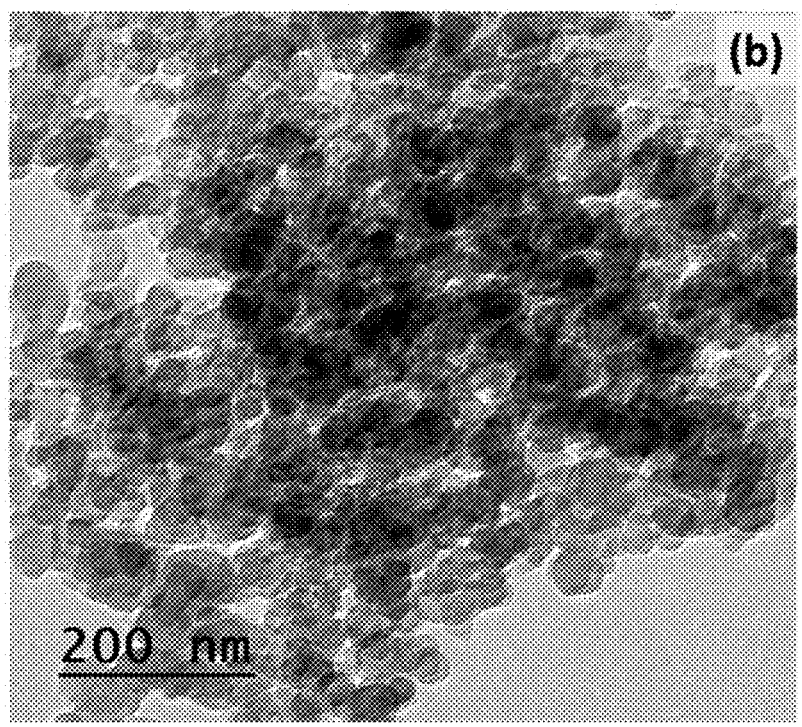
FIG. 3B shows a TEM of $Fe_2O_3$ NPs at 20 μm.

The absorption peak of the prepared $Fe_2O_3$ NPs was evaluated using UV-Vis spectrophotometry (JASCO 770, Japan) (See FIG. 1). The prepared $Fe_2O_3$ NPs (2 mg) was dispersed in 25 mL of $H_2O$ and sonicated for 15 minutes before measurement. The particle shape and particle distribution of $Fe_2O_3$ NPs were analyzed using Transmission Electron Microscopy (TEM, JEM-2001 operating at 200 kV). The TEM images were taken at different magnifications. For TEM examination (FIGS. 3A-3B), 2 mg of $Fe_2O_3$ NPs were dispersed in 25 mL of deionized water and dispersed by sonication. Then, two drops of the sonicated solution were placed onto copper grids with an ultrathin layer of carbon and left for air drying before TEM characterization. The average particle size and zeta potential of the $Fe_2O_3$ NPs were evaluated using Nano-ZS, Malvern Instruments Ltd., (UK). The dispersed solution of $Fe_2O_3$ NP sample was sonicated for 15 minutes prior to TEM investigation. The morphology of the synthesized $Fe_2O_3$ NPs was investigated via SEM (Tescan Vega 3, Czech Republic) (See FIGS. 5A-5D). The elemental analysis, atom percent, and mapping of the prepared $Fe_2O_3$ NPs were assessed using an energy dispersive spectroscopy (EDX, BRUKER) (See FIG. 6A). The particle shape of $Fe_2O_3$ NPs was seen at different magnifications using Transmission Electron Microscopy (TEM).

The successful preparation of $Fe_2O_3$ NPs was affirmed via UV-Vis spectroscopy. The $Fe_2O_3$ NPs were synthesized using RP which acted as a reducing and capping agent. The latter contained many active groups such as OH, COO—, $NH_2$. During preparation of $Fe_2O_3$ NPs, the active groups of RP extract has many roles. First, these groups reduce the iron ions and convert them from $Fe^{3+}$ into $Fe^0$, then oxidize them to form $Fe_2O_3$ NPs. Afterwards, the RP bearing these functional groups caps the resultant $Fe_2O_3$ NPs and keeps the formed nanoparticles from aggregation. As shown in FIG. 1, $Fe_2O_3$ NPs exhibited two absorption peaks at 366 and 420 nm. These peaks may be attributed to the capping effect of RP that led to formation of $Fe_2O_3$ NPs in very small size. Therefore, a blue shift in the wavelength in UV-Vis spectra was observed.

Figure 2:
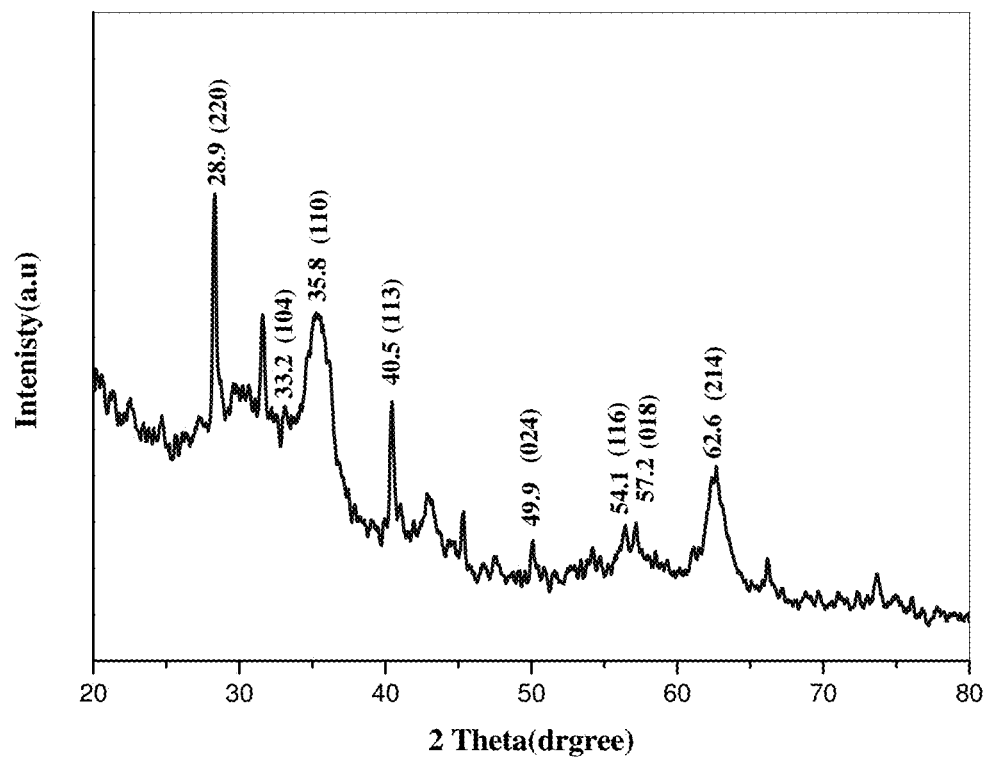
FIG. 2 shows an X-ray diffraction (XRD) of $Fe_2O_3$ NPs.

The crystal structure, phase purity, and phase composition of $Fe_2O_3$ NPs were affirmed using X-ray diffractometer (XRD) as illustrated in FIG. 2. As clearly seen, XRD spectra identify the formation of $Fe_2O_3$ NPs with crystal lattice. The spectra exhibited distinguished diffraction peaks falls at $2\theta=28.8°, 33.2°, 35.8°, 40.5°, 49.9°, 54.10, 57.2°$, and $62.5°$ that coincide with (220), (104), (110), (113), (024), (116), (018), and (214) planes of crystal lattice of $Fe_2O_3$ NPs, respectively.

These results are in agreement with the previous literature that studied the crystal structure of $Fe_2O_3$ NPs. There are no extra diffraction peaks in the XRD pattern thereby confirming the phase purity of the obtained $Fe_2O_3$ NPs sample.

To investigate the particle shape and distribution of the synthesized $Fe_2O_3$ NPs using RP as both reducing and stabilizing agents, TEM was used. TEM images were taken at two magnifications with different scales (500 nm and 200 nm). As shown in the TEM images, (FIGS. 3A and 3B), $Fe_2O_3$ NPs are entirely composed of crystals with a relatively uniform, nearly spherical shape. TEM images indicate a very uniform size distribution of $Fe_2O_3$ NPs.

Figure 4A:
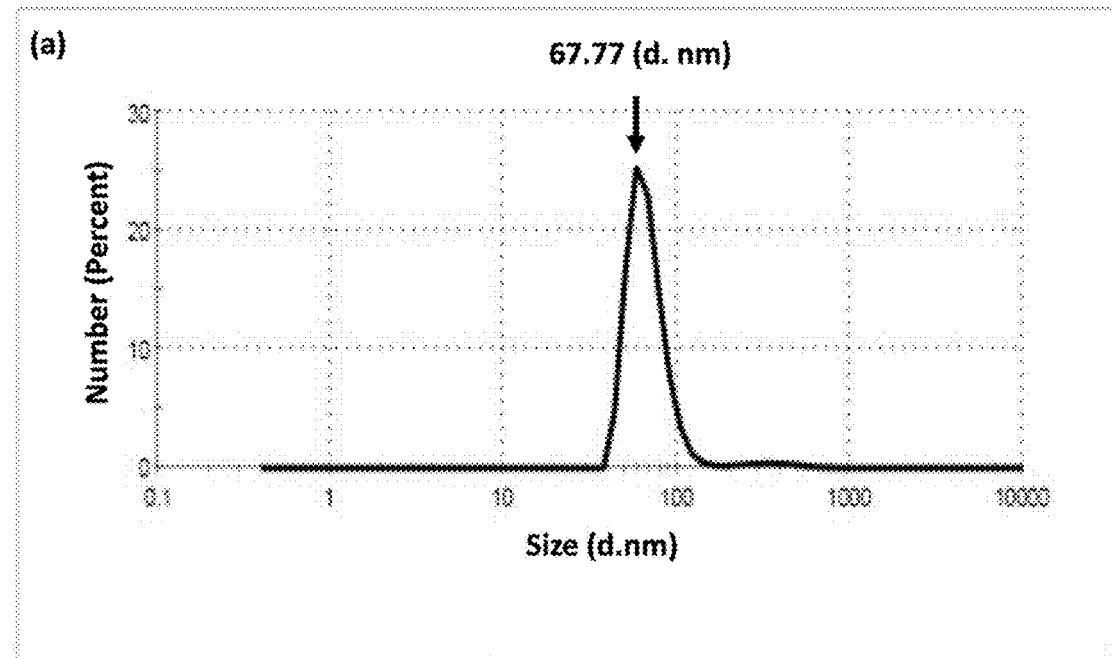
FIG. 4A is a graph showing particle size of $Fe_2O_3$ NPs.
Figure 4B:
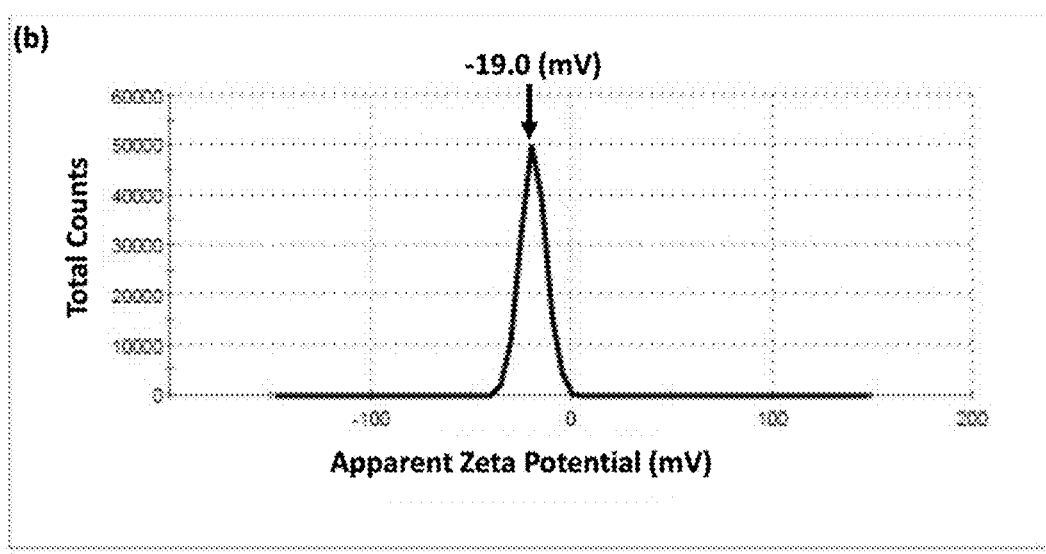
FIG. 4B is a graph showing zeta potential of $Fe_2O_3$ NPs.
Figure 5A:
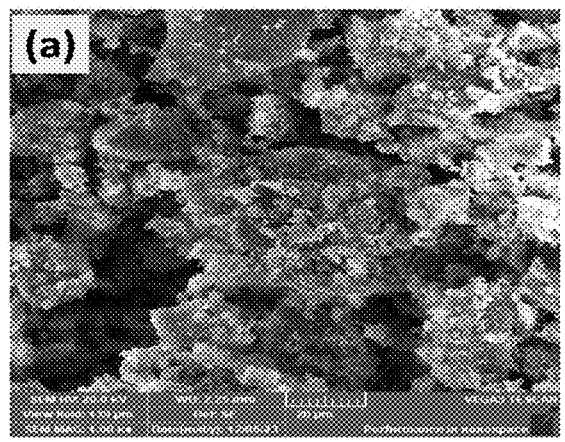
FIG. 5A is a scanning electron microscope (SEM) of $Fe_2O_3$ NPs at 20 μm magnification.
Figure 5B:
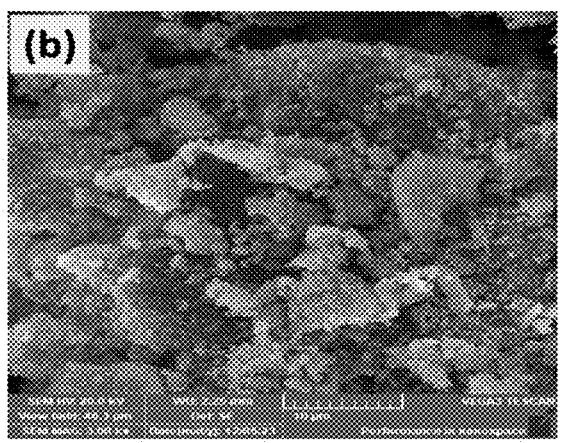
FIG. 5B is a SEM of $Fe_2O_3$ NPs at 10 μm magnification.
Figure 5C:
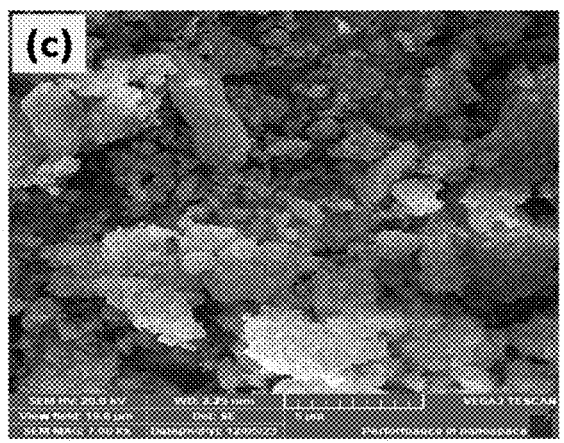
FIG. 5C is a SEM of $Fe_2O_3$ NPs at 5 μm magnification.
Figure 5D:
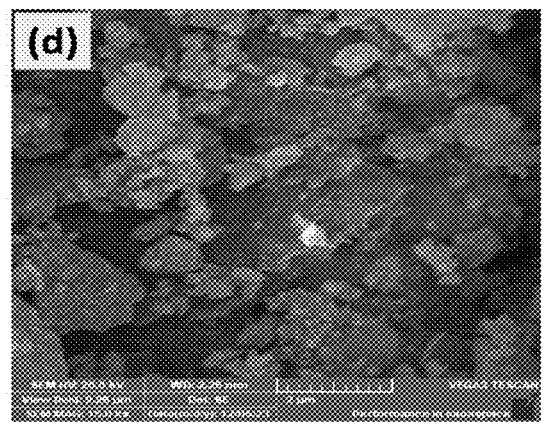
FIG. 5D is a SEM of $Fe_2O_3$ NPs at 2 μm magnification.

The average particle size was assessed depending on the technique of dynamic light scattering (DLS) and the obtained data was plotted in FIG. 4A. From particle size analysis (FIG. 4A), it was observed that the average hydrodynamic size of $Fe_2O_3$ NPs was 67.77 nm with 97.4% uniformity of the produced $Fe_2O_3$ NPs. These results confirmed the ability of the RP extract to produce homogenous $Fe_2O_3$ NPs with small size. The homogenous and small size of $Fe_2O_3$ NPs depicted by DLS is in agreement with TEM data. Moving to Zeta potential evaluation for $Fe_2O_3$ (FIG. 4B), it can be clearly seen that $Fe_2O_3$ NPs exhibited good zeta potential value (−19.0 mV) which is close to −30 mV. The negative charge could be attributed to the surface charge of bioactive components that coated the surface of $Fe_2O_3$ NPs.

The surface texture of the prepared biogenic $Fe_2O_3$ NPs was further assessed using SEM. SEM images (FIGS. 5A-5D) were taken at four different magnifications to examine the definitive evidence of the morphology and shape of the synthesized $Fe_2O_3$ NPs. The obtained results using SEM analysis clearly display that $Fe_2O_3$ NPs have a uniform spherical shape. The particles are well ordered and there is no evidence of any defects in the structure signifying that the biogenic synthesis process was successful for the formation of $Fe_2O_3$ NPs.

Figure 6B:
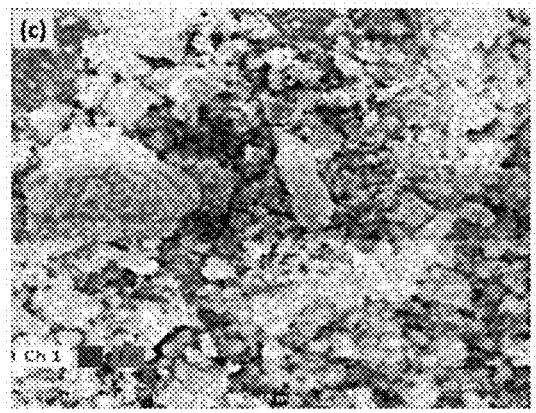
FIG. 6B is an elemental mapping of the prepared $Fe_2O_3$ NPs showing Oxygen in red and Iron in blue.
Figure 6C:
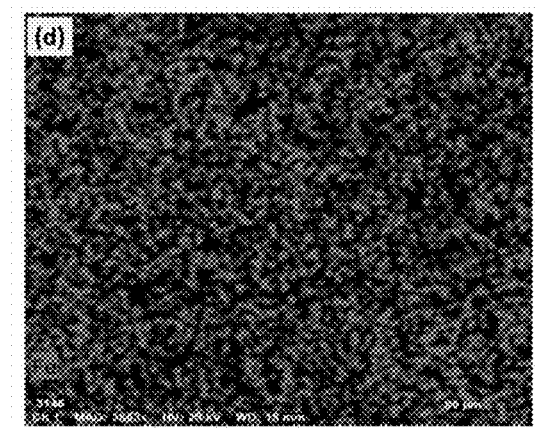
FIG. 6C is an elemental mapping of the prepared $Fe_2O_3$ NPs highlighting the Iron in the prepared $Fe_3O_2$ NPs
Figure 6D:
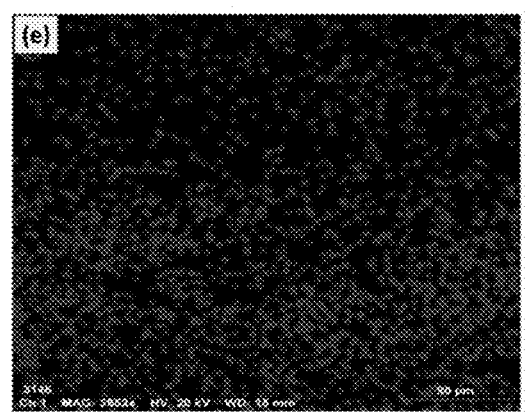
FIG. 6D is an elemental mapping of the prepared $Fe_2O_3$ NPs highlighting the Oxygen in the prepared $Fe_3O_2$ NPs.

EDX analysis was conducted to clarify the distribution of elements comprising $Fe_2O_3$ NPs capped with bioactive components. The composition of $Fe_2O_3$ NPs stabilized by active components was displayed in FIGS. 6A-6D. The atomic (%) of each element was displayed in the table below (Table 1). It can be observed that, Chlorine, Potassium, carbon, sodium and silicon elements can be attributed to the bioactive components of RP extract that were used for the stabilization of $Fe_2O_3$ NPs. The preparation of $Fe_2O_3$ NPs was affirmed by the presence of iron and oxygen in EdX graph (FIG. 6A). The atomic (%) of iron and oxygen recorded was 18.6% and 44.87%, respectively, as shown in Table 1. Additionally, the mapping images (FIGS. 6B, 6C, and 6D) demonstrate the distribution of iron and oxygen in the prepared $Fe_2O_3$ NPs that were stabilized with RP. The mapping images outline the good distribution of elements. The good distribution clarified the ability of RP to stabilize the formed $Fe_2O_3$ NPs and protect these nanoparticles from agglomeration.

TABLE 1

| Element | At. No. | Netto | Mass [%] | Mass Norm. [%] | Atom [%] | Abs. Error [%] (1 sigma) | Rel. Error [%] (1 sigma) |
|---|---|---|---|---|---|---|---|
| Iron | 26 | 10144 | 20.9 | 39.82 | 10.6 | 0.63 | 3 |
| Oxygen | 8 | 3562 | 14.44 | 27.51 | 44.87 | 2.44 | 16.88 |
| Chlorine | 17 | 5033 | 4.58 | 8.72 | 6.41 | 0.2 | 4.34 |
| Potassium | 19 | 4281 | 4.28 | 8.16 | 5.44 | 0.18 | 4.12 |
| Carbon | 6 | 340 | 3.8 | 7.23 | 15.71 | 1.23 | 32.3 |
| Sodium | 11 | 1451 | 2.56 | 4.87 | 5.53 | 0.22 | 8.71 |
| Silicon | 14 | 2948 | 1.94 | 3.7 | 3.43 | 0.12 | 6.26 |

Example 3

Biological Evaluation of Phyto-Synthesized $Fe_2O_3$ NPs

Preparation of Stock Solution

The process of preparing the stock solution of phyto-synthesized $Fe_2O_3$ NPs was conducted by suspending 100 mg of the NPs in 10 mL of sterile water. Then, the mixture was subjected to sonication for 20 minutes to achieve dispersion.

Preparation of Bacterial Strains

Four prominent bacterial pathogens were selected for the present investigation: two Gram-positive species (*Bacillus subtilis* and *Listeria monocytogenes*) and two Gram-negative species (*Escherichia coli* and *Klebsiella pneumoniae*). Fresh Luria-Bertani (LB) broth was adopted to cultivate the bacterial strains, which were then incubated at 37° C. for 18-24 hours until they achieved the mid-log phase. Following incubation, established cultures were centrifuged for 15 minutes at 6000 rpm to separate the pellet cells. Phosphate-buffered saline (PBS) was used twice to wash the resulting cell pellets to remove any last bits of growth medium ingredients or macromolecules. The tests used microbial suspensions that were standardized to yield $1.5 \times 10^7$ CFU/mL.

Example 4

Antibacterial Activity of Phyto-Synthetized $Fe_2O_3$ NPs

The antibacterial potential of $Fe_2O_3$ NPs against *E. coli, K. pneumonia, B. subtilis* and *L. monocytogenes* was evaluated. The agar well diffusion assay was applied by spreading approximately 100 µL of bacterial culture suspensions containing $10^6$ CFU/mL over Muller-Hinton agar (MHA) plates. Subsequently, 6 mm diameter wells were created on the agar surface, and different quantities (5, 10, 25, and 50 g/mL) of the RP-$Fe_2O_3$ NPs were introduced into these wells. The agar plates were then chilled at 4° C. for 1 hour before being moved to an incubator maintained at 37° C. for 24 hours. The evaluation of antibacterial activity was performed by measuring the diameter of the inhibition zone where bacterial growth was prohibited (reported in mm) around the wells.

In Vitro Susceptibility Testing

Figure 7:
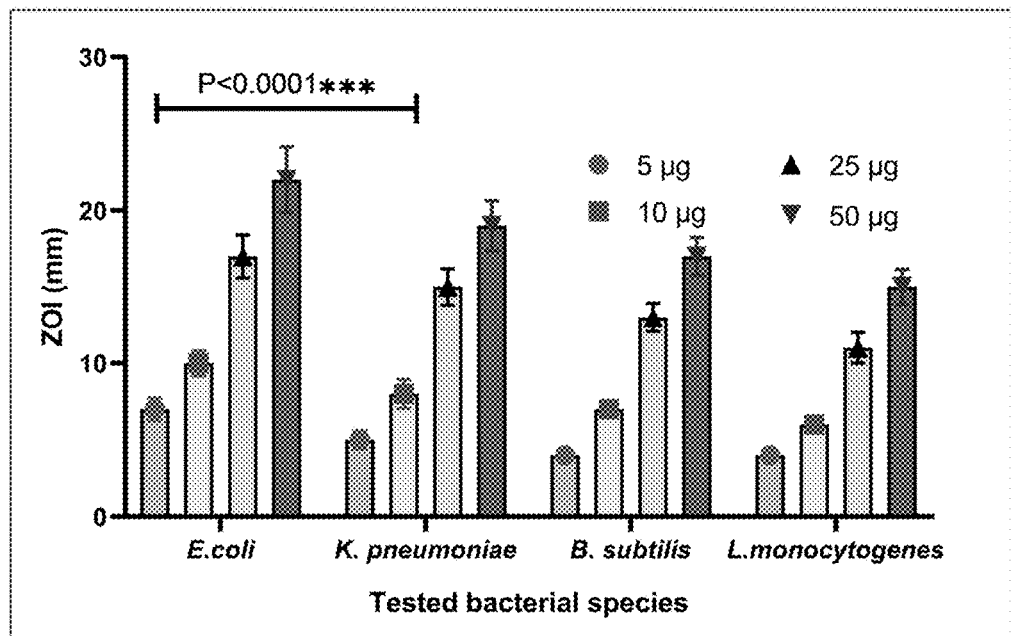
FIG. 7 is a graph showing inhibition zones of different concentrations of $Fe_2O_3$ NPs against four bacterial pathogens.

FIG. 7 offers measurements of inhibition zone (ZOI) widths, recorded in mm, delineating the impact of different concentrations of phyto-synthesized $Fe_2O_3$ NPs on four distinct bacterial pathogens. Evaluating the inhibitory effect across concentrations (5 µg, 105 µg, 255 µg, and 505 µg), *E. coli* displayed inhibition zone diameters of 7±0.71 mm, 10±0.82 mm, 17±1.4 mm, and 22±2.14 mm, respectively. Similarly, *K. pneumoniae* showcased diameters of 5±0.59 mm, 8±0.95 mm, 15±1.2 mm, and 19±1.63 mm, mirroring the increasing concentrations tested. *B. subtilis* manifested inhibition zone diameters of 4±0.36 mm, 7±0.37 mm, 13±0.93 mm, and 17±1.28 mm across the respective concentrations, which exhibited a consistent trend of larger inhibition zones at higher NP concentrations. In parallel, *L. monocytogenes* exhibited diameters of 4±0.28 mm, 6±0.45 mm, 11±1.0 mm, and 15±1.16 mm, consistently reflecting the escalating inhibitory effect with rising NP concentrations. The findings uniformly underscore that the inhibitory impact of phyto-synthesized $Fe_2O_3$ NPs against these bacterial pathogens intensifies with increasing concentrations.

Example 5

Resazurin-Based Turbidometric Assay

In order to identify the exact inhibitory concentrations of $Fe_2O_3$ NPs against *E. coli, K. pneumoniae, B. subtilis*, and *L. monocytogenes*, the turbidometric (TB) assay based on Resazurin was utilized. By employing the broth microdilution technique in a 96-well microplate configuration, the MIC of $Fe_2O_3$ NPs against the chosen bacterial strains was determined. At the start of the experiment, $Fe_2O_3$ NPs were diluted to generate a range of concentrations between 500 and 16.1 g/mL. Simultaneously, wells containing different concentrations of $Fe_2O_3$ NPs were supplemented with the bacterial inoculum, which had been modified to a density equivalent to the 0.5 McFarland standard (log 8 CFU/mL). This was done in the presence of 150 µL of Tryptic Soy Broth (TSB) that had been inoculated with bacterial cultures. Subsequently, 50 µL of each concentration of $Fe_2O_3$ NPs was introduced into the corresponding wells, with sterile distilled water functioning as the control. The microplate was subsequently incubated at 37° C. for 24 hours. Following incubation, 30 µL of a resazurin solution with a concentration of 0.015% was added to each well. The microplate was then incubated for an additional 2-4 hours to observe any color changes. Wells that retained the blue resazurin color throughout the incubation period were classified as having exceeded the MIC level. The absence of growth in these wells indicates that the concentration of $Fe_2O_3$ NPs inhibited bacterial proliferation above the MIC.

Estimation of MIC and MBC

Figure 8:
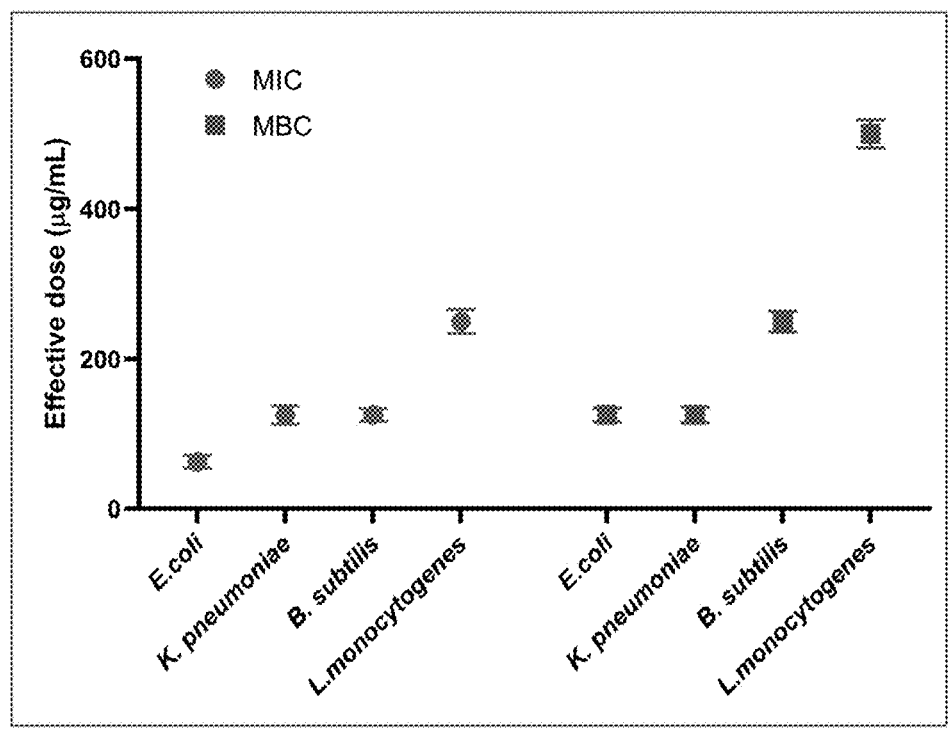
FIG. 8 is a graph showing Minimum Inhibitory Concentration (MIC) and Minimum Bactericidal Concentration (MBC) values of phyto-synthesized $Fe_2O_3$ NPs against four distinct pathogenic bacteria.

The efficacious doses of phyto-synthesized $Fe_2O_3$ NPs against four bacterial strains are shown in FIG. 8. Utilizing plant extracts or phytochemicals to aid in the production of the nanoparticles, the phytochemical approach was used to create these NPs. By assessing the MIC and MBC, the efficacy of $Fe_2O_3$ NPs against the bacterial strains is ascertained (FIG. 8). The MBC demonstrated the lowest concentration at which the NPs totally destroyed the bacterial cells, while the MIC demonstrated the lowest concentration of the NPs that prevents the bacteria from growing visibly. The phyto-synthesized $Fe_2O_3$ NPs had MIC of 62.5±8.3 µg/mL for *E. coli*. This indicates that the NPs effectively stop *E. coli* from growing at concentrations of 62.5 µg/mL and above. The MBC value for *E. coli* was 125±9.35 µg/mL, meaning that the *E. coli* cells must be killed at a concentration of 125 µg/mL or above. The effective concentration of phyto-synthesized $Fe_2O_3$ NPs in the instance of *K. pneumoniae* was determined to be 125±12.2 µg/mL. *K. pneumoniae* was inhibited from growing at this dose. It was noted that *K. pneumoniae* also had an MBC value of 125±10.4 µg/mL, indicating that the *K. pneumoniae* cells may be killed at the same dose. The MIC value for *B. subtilis* was found to be 125±10.4 µg/mL. As with *K. pneumoniae* and *E. coli*, the effective concentration of *B. subtilis* was 125 µg/mL. Nonetheless, *B. subtilis* had a higher MBC value of 250±13.8 µg/mL, suggesting that a larger dose was required to provide bactericidal action against this strain of bacteria. Finally, it was shown that the effective concentration was 250±15.6 µg/mL for *L. monocytogenes*. *L. monocytogenes* cannot grow at this concentration. The MBC value of *L. monocytogenes* was 500±18.5 µg/mL, suggesting that bactericidal action against this specific strain requires a greater dosage. The findings together indicate that the investigated bacterial strains were susceptible to the antibacterial action of the photosynthesized $Fe_2O_3$ NPs. The efficiency of the NPs varies depending on the strain; *E. coli* and *K. pneumoniae* were less sensitive to NP concentrations than *B. subtilis* and *L. monocytogenes*.

Example 5

Time Killing Effect Assay

To monitor the proliferation of certain bacterial strains over different time intervals (25-300 minutes), concentrations of $Fe_2O_3$ NPs corresponding to the MIC against those strains were evaluated for the time-dependent investigation. At the outset, 10 mL of sterile Falcon tubes were filled with PBS. Subsequently, 0.2 mL of each bacterial strain was injected into each tube. Following this, the bacterial solution that was obtained was transferred into individual Falcon tubes, each containing the MIC concentration for a specific bacterial strain (0.5×MIC, 1×MIC, and 2×MIC). Samples of 1 mL were extracted from each tube containing the bacterial suspension at predetermined intervals. The aforementioned samples were utilized in the pour-plate method to determine the number of viable bacterial cells in populations.

Figure 9A:
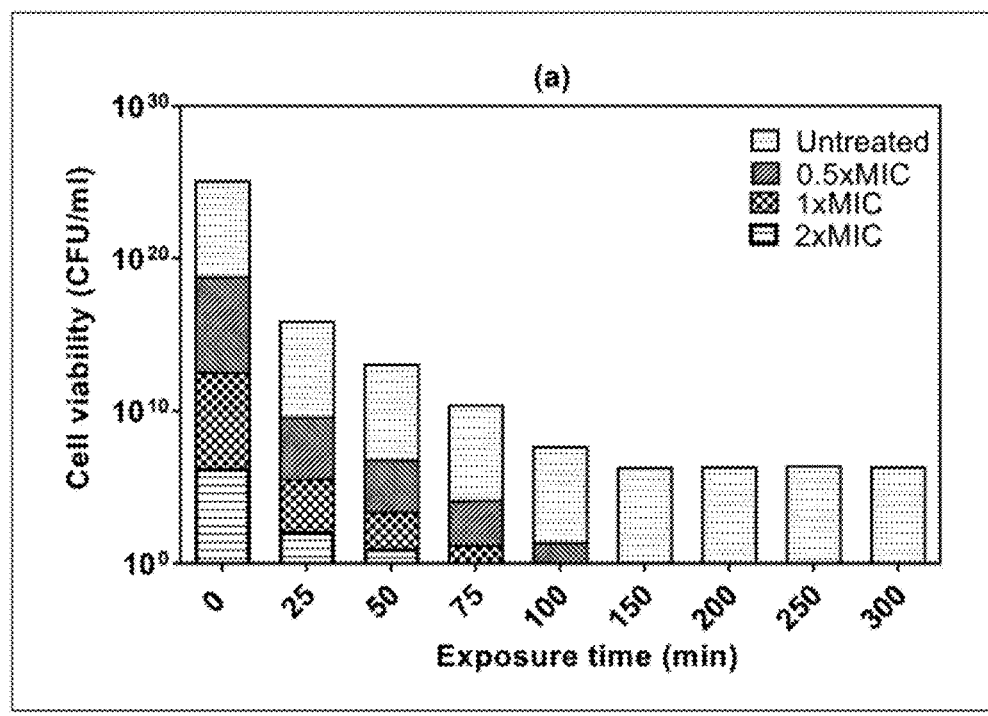
FIG. 9A is a time-kill profile of $Fe_2O_3$ NPs targeting *E. coli*.
Figure 9B:
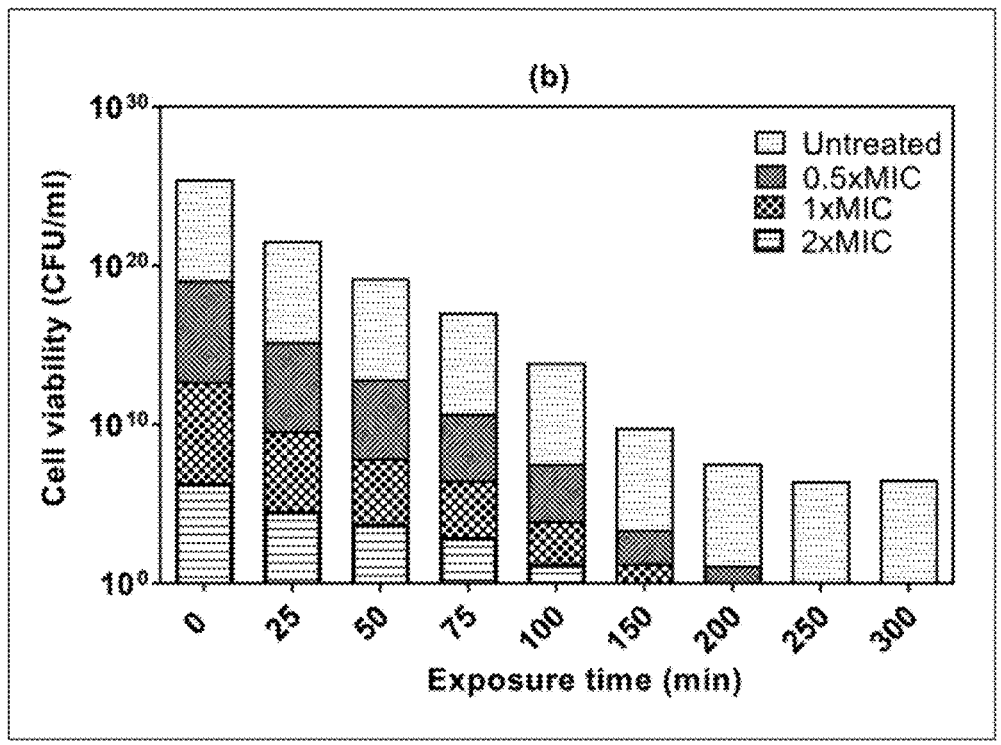
FIG. 9B is a time-kill profile of $Fe_2O_3$ NPs targeting *K. pneumoniae*.
Figure 9C:
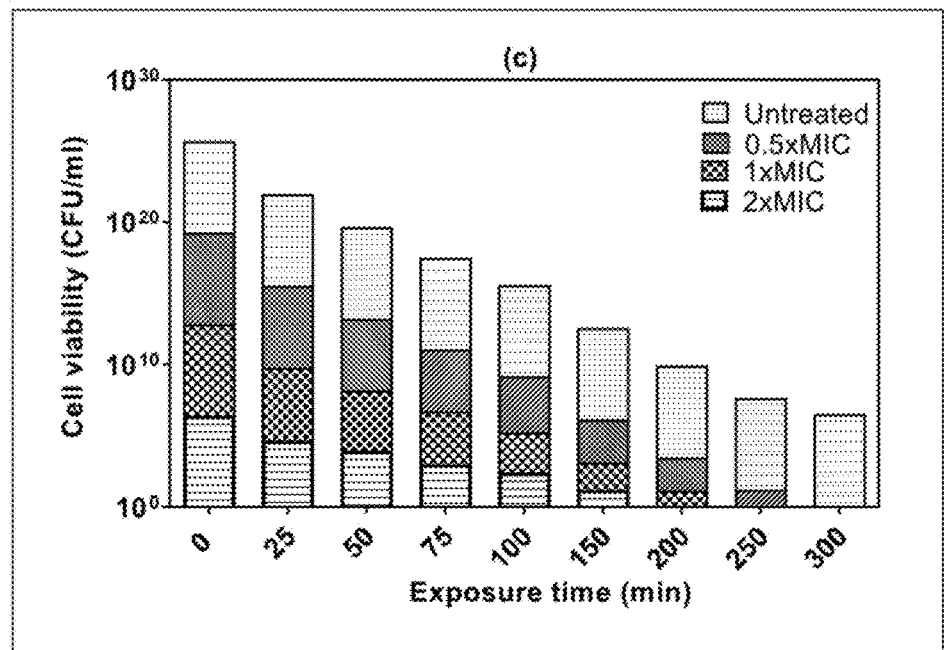
FIG. 9C is a time-kill profile of $Fe_2O_3$ NPs targeting *B. subtilis*.
Figure 9D:
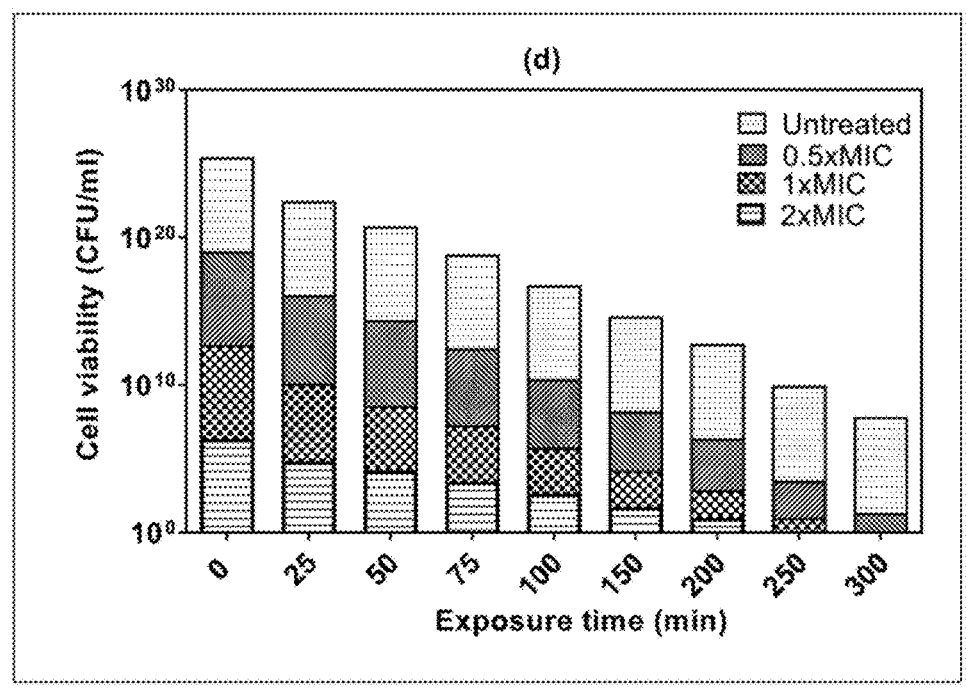
FIG. 9D is a time-kill profile of $Fe_2O_3$ NPs targeting *L. monocytogenes*.
Figure 10A:
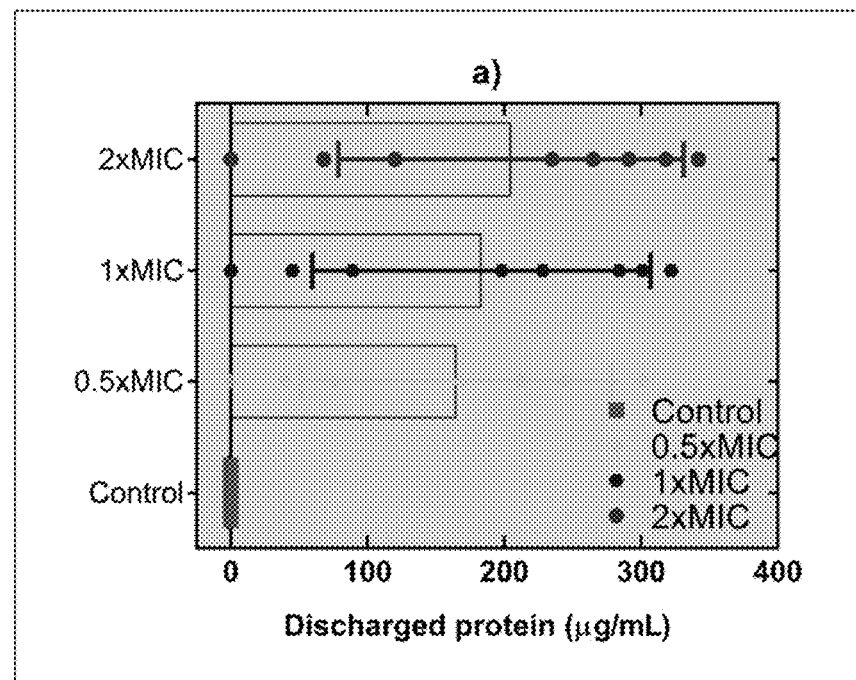
FIG. 10A is a chart showing the quantity of intracellular protein released from damaged bacterial cells of *E. coli* following exposure to various MIC concentrations of $Fe_2O_3$ NPs.
Figure 10B:
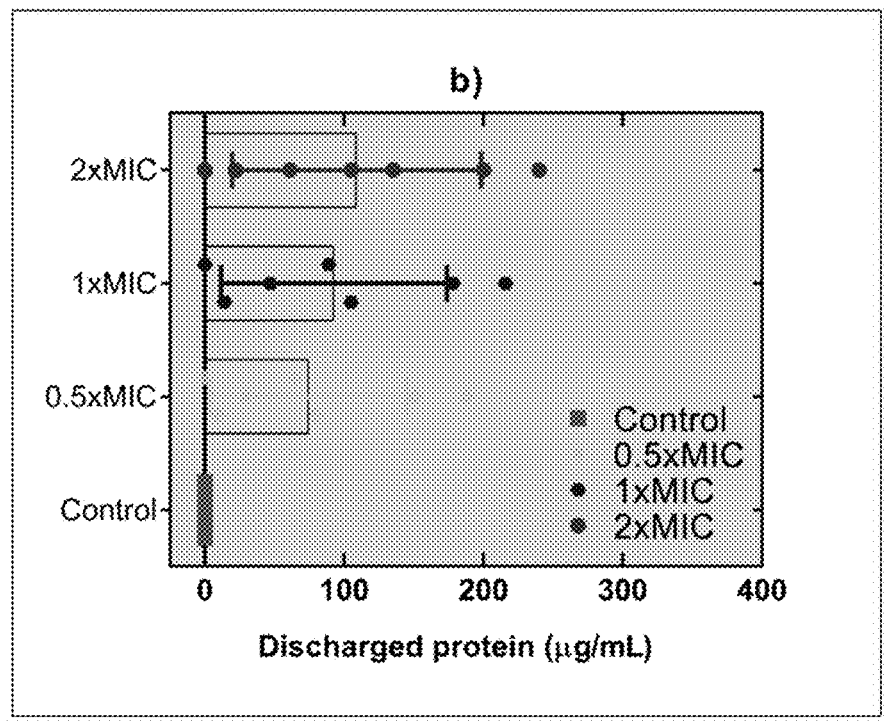
FIG. 10B is a chart showing the quantity of intracellular protein released from damaged bacterial cells of *K. pneumoniae* following exposure to various MIC concentrations of $Fe_2O_3$ NPs over different timeframes.
Figure 10C:
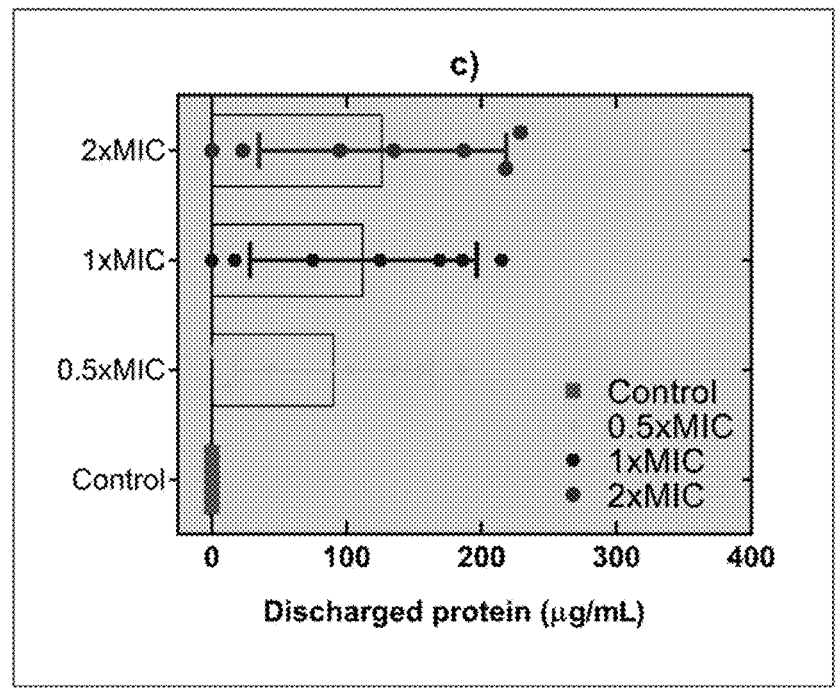
FIG. 10C is a chart showing the quantity of intracellular protein released from damaged bacterial cells of *B. subtilis* following exposure to various concentrations of $Fe_2O_3$ NPs.
Figure 10D:
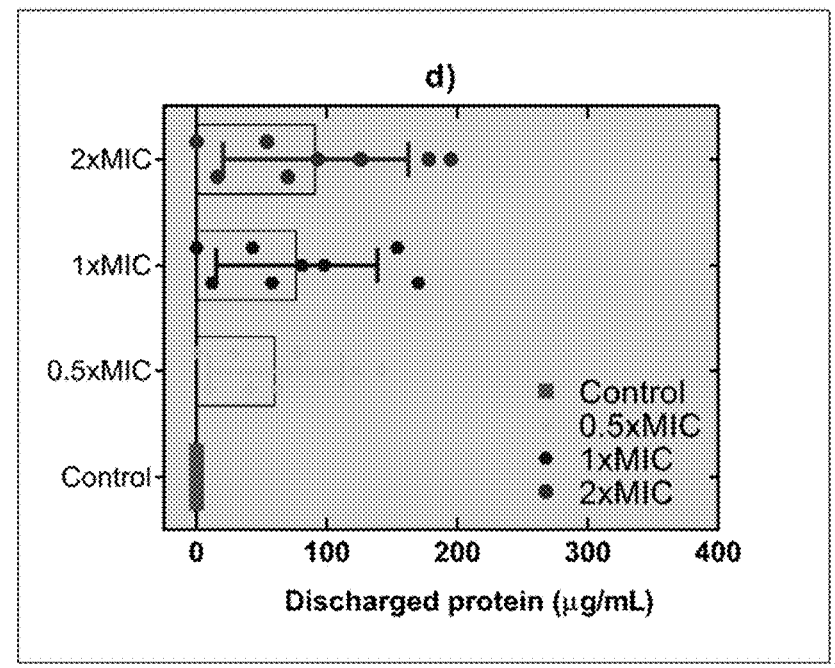
FIG. 10D is a chart showing the quantity of intracellular protein released from damaged bacterial cells of *L. monocytogenes* following exposure to various concentrations of $Fe_2O_3$ NPs.
Figure 11A:
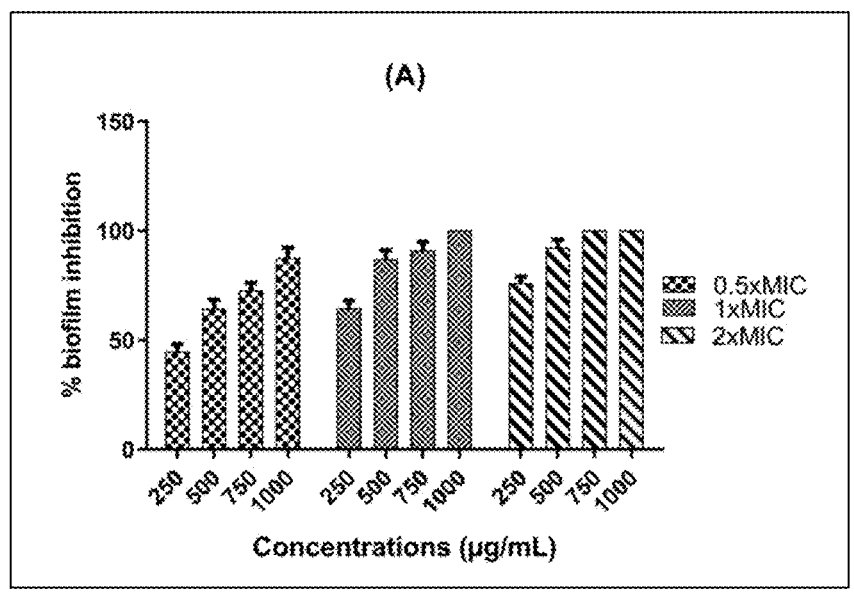
FIG. 11A is a graph of biofilm inhibition of *E. coli* following exposure to various concentrations of $Fe_2O_3$ NPs.
Figure 11B:
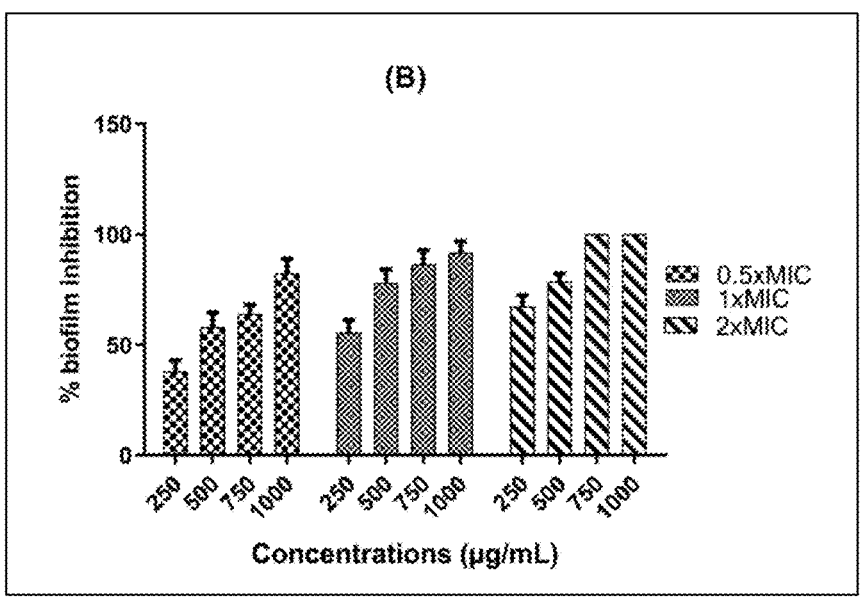
FIG. 11B is a graph of biofilm inhibition of *K. pneumoniae* following exposure to various concentrations of $Fe_2O_3$ NPs.
Figure 11C:
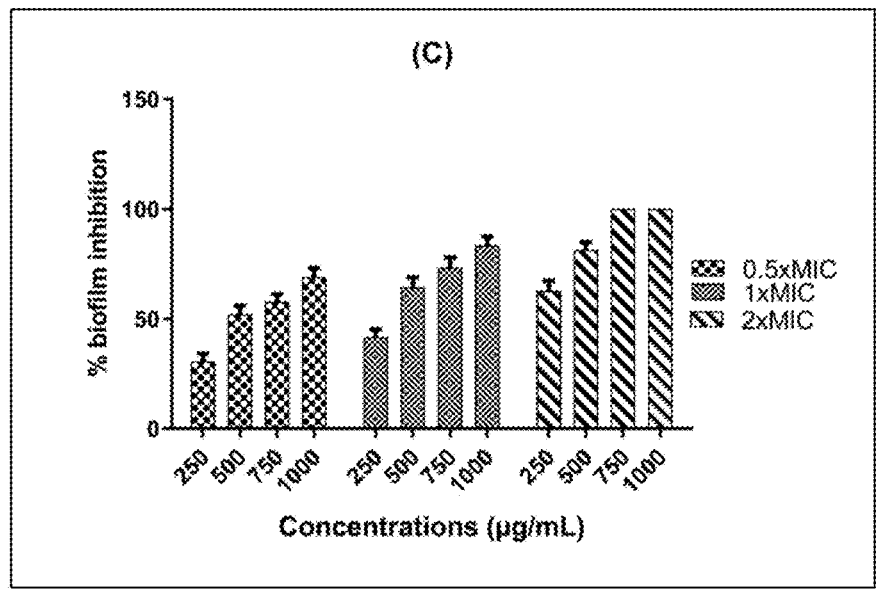
FIG. 11C is a graph of biofilm inhibition of *B. subtilis* following exposure to various concentrations of $Fe_2O_3$ NPs.
Figure 11D:
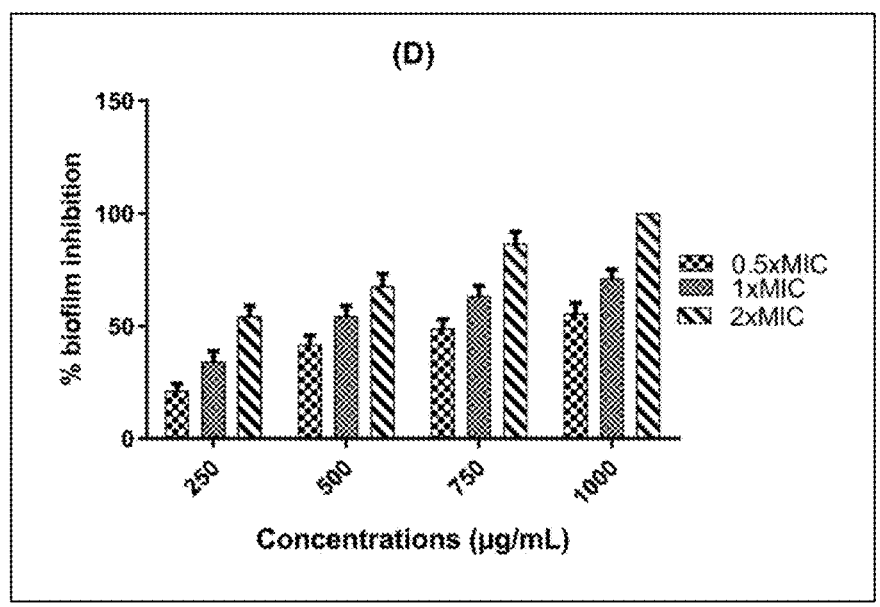
FIG. 11D is a graph of biofilm inhibition of *L. monocytogenes* following exposure to various concentrations of $Fe_2O_3$ NPs.

In the study, bacterial viability reduction was monitored across various time intervals and concentrations of $Fe_2O_3$ NPs, relative to their MIC (FIGS. 9A-9D). The log viable count for $E.$ $coli$ displayed complete reduction within 150, 100, and 7 min when exposed to 0.5×MIC, 1×MIC, and 2×MIC concentrations, respectively (FIG. 9A). Similarly, $K.$ $pneumoniae$ exhibited complete reduction after 250, 200, and 150 min at 0.5×MIC, 1×MIC, and 2×MIC, respectively (FIG. 9B). Results of $B.$ $subtilis$ illustrated in FIG. 9C indicated that the complete reduction took 300, 250, and 200 min at 0.5×MIC, 1×MIC, and 2×MIC, respectively, while $L.$ $monocytogenes$ required longer exposure times (3000 and 250 min) noted for 1×MIC and 2×MIC concentrations (FIG. 9D). These outcomes highlight the broad-spectrum efficacy of $Fe_2O_3$ NPs against tested bacteria, showcasing potent antibacterial properties. The phyto-synthesized $Fe_2O_3$ NPs demonstrated robust biocidal effects against diverse microorganisms. Notably, Gram-negative bacteria exhibited higher susceptibility to the NPs' antimicrobial action compared to Gram-positive bacteria. This difference in susceptibility can be attributed to the weaker cell walls of gram-negative bacteria, making them more vulnerable to damage at lower concentrations and shorter exposure periods to $Fe_2O_3$ NPs. The enhanced antibacterial efficacy of the NPs may stem from their increased surface area, positive surface density, and better interaction with the negatively charged cell membranes of bacteria. Moreover, their nano-sized structure facilitates easier penetration into bacterial cells, heightening cell permeability and resulting in bacterial cell death.

Example 6

Intracellular Protein Leakage Assay

The release of intracellular proteins into the extracellular fluid after the breakdown of bacterial cells triggered by each $Fe_2O_3$ NPs at its corresponding (MIC) was measured using the Bradford experiment. During the exponential growth phase, bacterial cells were subjected to MIC values of $Fe_2O_3$ NPs and then incubated in a shaker for different times at 150 rpm and 37° C. for a total of 3, 6, 9, and 12 hours in a rotating incubator. To separate the cellular components, the samples were centrifuged at 12,000 rpm for 10 minutes at a temperature of 4° C. following incubation. By measuring the optical density of the supernatant at 595 nm, the amount of intracellular protein discharge was detected.

The aim of the research was to examine the effect of $Fe_2O_3$ NPs on the rupture of bacterial cells and the consequent release of internal proteins. To assess the amount of proteins produced as a consequence of the damage to the bacterial cells, different concentrations of $Fe_2O_3$ NPs equal to the MIC (0.5, 1, and 2×MIC) were administered. The results (FIGS. 10A-10D) showed that various bacterial species' release of proteins in response to $Fe_2O_3$ NPs varied significantly. As the concentration of $Fe_2O_3$ NPs was increased, the measured amounts of released proteins for $E.$ $coli$ were 301 µg/mL, 322 µg/mL, and 342 µg/mL, respectively. This suggests that the quantity of proteins produced from injured $E.$ $coli$ cells increased along with the dose of $Fe_2O_3$ NPs. For the comparable doses of $Fe_2O_3$ NPs, the released protein levels for $K.$ $pneumoniae$ were 67 µg/mL, 216 µg/mL, and 240 µg/mL, respectively. These findings imply that when exposed to greater concentrations of $Fe_2O_3$ NPs, $K.$ $pneumoniae$ cells produced more proteins. Comparably, in response to the increasing concentrations of $Fe_2O_3$ NPs, $B.$ $subtilis$ showed released protein amounts of 186 µg/mL, 215 µg/mL, and 229 µg/mL, while $L.$ $monocytogenes$ showed released protein quantities of 142 mg, 170 µg/mL, and 195 µg/mL. These results show that as the concentrations of $Fe_2O_3$ NPs increased, so did the quantities of proteins produced by both $B.$ $subtilis$ and $L.$ $monocytogenes$. These findings imply that internal proteins are released when bacterial cells rupture as a consequence of $Fe_2O_3$ NPs, and that the amount of proteins released varies depending on the kind of bacteria. The variances in the bacterial cell membranes' sensitivity to the disruptive effects of $Fe_2O_3$ NPs and the cellular response to damage following may be the cause of the variations in the quantity of released protein.

It is well-recognized that $Fe_2O_3$ NPs have the ability to interact with bacterial cell membranes, causing damage and breakdown of the membrane. Depending on the NPs' characteristics and the make-up of the bacterial cell membranes, $Fe_2O_3$ NPs may or may not be able to enter the bacterial cells and breach the membrane. Thus, the differences in cell wall structure make Gram-negative bacteria more susceptible to direct interactions with positively charged nanoparticles compared to gram-positive bacteria. The thinner peptidoglycan layer in Gram-negative bacteria facilitates easier access of nanoparticles to the cytoplasmic membrane, while the thicker layer in gram-positive bacteria restricts such interactions. The content and structure of bacterial cell membranes may vary across different species. These changes can include lipid composition, membrane thickness, the existence of an outer membrane in Gram-negative bacteria, and the shape of the cell wall in gram-positive bacteria. There may be variations in the sensitivity of bacterial cells to the disruptive effects of $Fe_2O_3$ NPs as a consequence of these variances in membrane composition and structure. When exposed to $Fe_2O_3$ NPs, bacterial species with weaker or more sensitive cell membranes may sustain more damage and rupture, which would increase the release of intracellular proteins. Conversely, bacterial species that possess stronger or more resilient cell membranes could be less vulnerable to $Fe_2O_3$ NPs, which would lead to less disruption to the membrane and, as a consequence, less intracellular protein release. As a result, changes in the bacterial species' susceptibilities to the disruptive effects of $Fe_2O_3$ NPs may be used to explain variations in the quantities of released protein that are detected in response to these particles.

Example 7

Eradication of Biofilm Using Phyto-Synthetized $Fe_2O_3$ NPs

The impact of $Fe_2O_3$ NPs on disrupting established biofilm or preventing their formation was investigated. Bacterial cultures were propagated and 100 µL of the culture, with a uniform cell density of log 6 CFU/mL, was seeded into individual wells of a 96-well microtiter plate. These plates were then incubated to allow mature biofilm growth over 48 hours at 37° C. Following this incubation period, $Fe_2O_3$ NPs at varying concentrations (250-1000 µg/mL) were introduced into the plate wells, and further incubation ensued for 24 hours at 37° C. Tetracycline served as the positive control, while distilled water acted as the negative control. Biofilm estimation was conducted using the CV staining technique. After washing and air-drying the plates, 100 μL of a 1% CV solution was added to each well, and incubation at room temperature lasted for 15 minutes. Subsequently, excess stain residues were eliminated by washing the plates three times with sterile distilled water, resulting in the appearance of purple rings around the well borders, indicating biofilm presence. For quantitative assessment, 125 μL of ethanol was added to each well to remove the stain. Absorbance was measured at a wavelength of 590 nm using a microplate reader (Tecan, Männedorf, Switzerland) after transferring 100 μL of the destaining solution to a clean plate. Equation (Eq. 1) was utilized to calculate the average absorbance of the samples and determine the percentage of biofilm formation inhibition.

$$\%\text{biofilm inhibition} = \frac{OD \text{ untreated} - OD \text{ treated}}{OD \text{ untreated}} \times 100 \qquad \text{Eq: 1}$$

The study aimed to explore the impact of $Fe_2O_3$ NPs on biofilm formation by four bacterial strains, employing a 96-well polystyrene plate and assessing the optical density (OD 595) of CV dye within the wells. The findings, demonstrated in FIGS. 11A-11D, illustrated a dose-dependent inhibition of biofilm establishment for all bacteria when exposed to varying doses (250-1000 g/mL) of $Fe_2O_3$ NPs. With increasing concentrations of $Fe_2O_3$ NPs, a notable decrease in biofilm density among the tested bacterial strains was observed. Remarkably, complete inhibition of biofilm formation was achieved for *E. coli, K. pneumoniae, B. subtilis*, and *L. monocytogenes* upon treatment with $Fe_2O_3$ NPs at concentrations equal to or exceeding 2 times the MIC. Particularly, the concentration of 750 g/mL of $Fe_2O_3$ NPs exhibited 100% inhibition of biofilm formation, as delineated in FIGS. 11A-11D. In conclusion, the investigation underscored the dose-dependent inhibitory effect of $Fe_2O_3$ NPs on biofilm development across all examined bacterial strains. At concentrations equivalent to or higher than 2 times the MIC, $Fe_2O_3$ NPs entirely halted biofilm formation in *E. coli, K. pneumoniae, B. subtilis*, and *L. monocytogenes*. These findings accentuate the potential of $Fe_2O_3$ NPs as a promising strategy for impeding biofilm formation by these specific bacterial species.

Example 8

The Live/Dead Staining of Bacterial Biofilm

The live/dead staining methodology stands as an essential approach in evaluating bacterial viability within biofilms, serving as a pivotal tool in appraising the efficacy of treatments, notably $Fe_2O_3$ NPs, against biofilm-forming bacterial strains. To commence the study, mature biofilm were established independently for *E. coli* and *B. subtilis* strains, cultured for a duration of 48 hours on cover glasses. Subsequently, the formed biofilms were subjected to treatment using the predetermined effective dose of $Fe_2O_3$ NPs, meticulously applied to the pre-formed biofilms. Following the administration of $Fe_2O_3$ NPs, the treated biofilms were incubated for a standardized period of 30 minutes. For the live/dead staining procedure, specific fluorescent dyes tailored for distinguishing live and dead cells, namely acridine orange and propidium iodide, were amalgamated to create the staining solution. The treated biofilm samples underwent a gentle wash with a sterile buffer, ensuring the removal of any residual nanoparticles or culture media. Subsequently, the live/dead staining solution was uniformly applied to the surface of the biofilms and incubated under controlled conditions in darkness for the specified duration required for effective staining. Following the completion of the staining process, thorough examination of the stained biofilm samples was conducted using a confocal microscope. High-resolution imaging was employed to meticulously observe and capture images depicting the spatial distribution of bacteria within the biofilms, thereby enabling a comprehensive evaluation of bacterial viability subsequent to the treatment with $Fe_2O_3$ NPs.

The CLSM technique in reflection mode facilitated the visualization of potential interactions between the $Fe_2O_3$ NPs and bacterial cells. This method enables the concurrent detection of fluorescently stained bacteria along with the reflective signals emanating from the metallic NPs. The live/dead staining methodology stands as an essential approach in evaluating bacterial viability within biofilm, serving as a pivotal tool in appraising the efficacy of treatments, notably $Fe_2O_3$ NPs, against biofilm-forming bacterial strains such as *E. coli* and *B. subtilis*. To commence the study, mature biofilms were established independently, cultured for a duration of 48 hours on cover glasses. Subsequently, the formed biofilm were subjected to treatment using the predetermined effective dose of $Fe_2O_3$ NPs, meticulously applied to the pre-formed biofilm. Following the administration of $Fe_2O_3$ NPs, the treated biofilm was incubated for a standardized period of 30 minutes. For the live/dead staining procedure, specific fluorescent dyes tailored for distinguishing live and dead cells, namely acridine orange and propidium iodide, were amalgamated to create the staining solution. The treated biofilm samples underwent a gentle wash with a sterile buffer, ensuring the removal of any residual nanoparticles or culture media. Subsequently, the live/dead staining solution was uniformly applied to the surface of the biofilm and incubated under controlled conditions in darkness for the specified duration required for effective staining. Following the completion of the staining process, thorough examination of the stained biofilm samples was conducted using a confocal microscope. High-resolution imaging was employed to meticulously observe and capture images depicting the spatial distribution of bacteria within the biofilms, thereby enabling a comprehensive evaluation of bacterial viability subsequent to the treatment with $Fe_2O_3$ NPs.

Example 9

Assessment of Toxicological Effect of Phyto-Synthetized $Fe_2O_3$ NPs

The ToxAlert® 100 system was designed exclusively for toxicity assessments employing freeze-dried *Vibrio fischeri* cells, together with the appropriate reconstitution substances. To start the procedure, freeze-dried cells of *Vibrio fischeri* were revived by combining them with a cold reconstitution solution and stirring them gently. Approximately 10 μL of the diluted sample was put into cuvettes containing 500 μL of a diluent reagent consisting of a 2% sodium chloride solution. Next, 10 μL ($10^6$ cells) of recently generated photobacteria were introduced. The sample and photobacteria were combined and put into specified wells in the system. The combination was then incubated for 5, 10, and 15 minutes under regulated cooling temperatures that are appropriate for the specific bacteria being tested. After the specified incubation time, the emitted luminescence was quantified using the ToxAlert® 10 Luminometer system. The evaluation includes control groups that do not have any samples. This technique accurately identifies and measures the level of bioluminescence intensity generated by the bacteria in reaction to the tested substances. The percent luminescence inhibition (% I) was determined by comparing the luminescence response of a saline control solution to that of the sample (or diluted sample) or standard (or diluted standard). Hence, the equation representing bioluminescence inhibition is given by the expression % luminescence inhibition=1−(sample light/control light)×100

Figure 12:
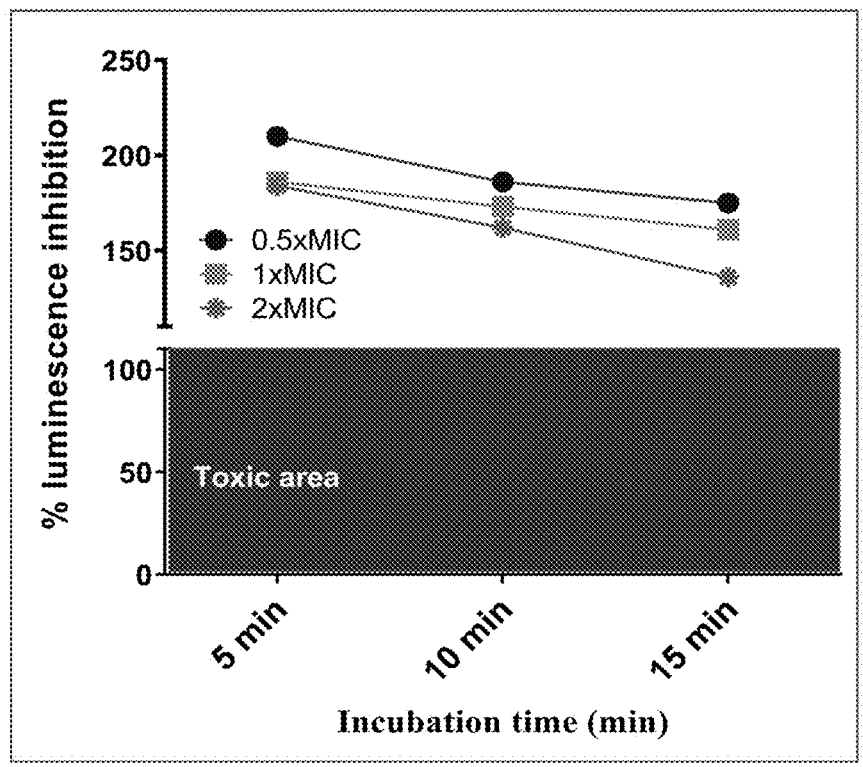
FIG. 12 is a graph showing bioavailability of photobacteria after exposure to $Fe_2O_3$ NPs.

One of the most trustworthy indicators for determining the toxicity of different compounds is the luminous bacteria *V. fischeri*. The amount of toxicity is shown by the reduction of bacterial light generation, which shows how toxicants affect bacterial membranes. This dose-dependent inhibition happens quickly-shortly after the toxicant and bacteria come into contact. When used for *V. fischeri* samples, the flash test corrects for turbidity and colour, making it possible to evaluate toxicity in a variety of sample types. In this investigation, the bioluminescence inhibition experiment with *V. fischeri* was used to investigate the toxicity of four different kinds of $Fe_2O_3$ NPs with three different concentrations, including 0.5×MIC, 1×MIC, and 2×MIC. Even at the highest concentration, the results showed that none of the evaluated α-$Fe_2O_3$ NPs were harmful to *V. fischeri*, indicating that the NPs were non-toxic in this evaluation. FIG. 12 shows the kinetics of the toxic impact of hematite NPs on *V. fischeri* after exposure for 5, 10, and 15 min. The % luminescence inhibition, however, was more than 100. Furthermore, earlier studies by Mamindy-Pajanya et al. showed that sediments containing hematite and zero-valent iron significantly decreased *V. fischeri* toxicity.

Example 10

Decontamination of Domestic Wastewater Using Phyto-Synthtized $Fe_2O_3$ NPs

The objective of this experiment was to assess the time-dependent disinfection efficacy of $Fe_2O_3$ NPs against waterborne pathogenic microorganisms including, *E. coli*, *K. pneumoniae*, *B. subtilis*, and *L. monocytogenes* in domestic wastewater. Initially, a fresh sample was collected from a wastewater treatment plant while maintaining aseptic conditions during transportation to the laboratory. The experiment was started by determining the initial viable cell density of selected waterborne pathogenic microorganisms including using selective media as per the manufacturer's instructions. Subsequently, a suspension of $Fe_2O_3$ NPs at effective concentrations, such as 2×MIC, was prepared. During the disinfection process, the $Fe_2O_3$ NPs suspension was continuously agitated magnetically. At specific time intervals (5, 10, 20, 40, 60, 80, and 100 minutes), 0.5 mL samples of the reaction suspension were collected for analysis. The collected samples underwent a plate-counting method to determine the viable cell density, allowing the assessment of effectiveness of $Fe_2O_3$ NPs in reducing the populations of waterborne pathogenic bacteria over exposure time. To ensure reliability and accuracy in the experimental setup and measurements, blank control experiments were conducted at the beginning of the study and intermittently throughout the time intervals.

Disinfection is the process of removing or destroying harmful organisms from water, such as bacteria, viruses, protozoa, worms, and larvae, so that it may be used for home purposes. Disinfectants are the names for the chemicals employed in this application. At the municipal level, disinfectants like chlorine ($Cl_2$), chloramines ($NH_2Cl$, $NHCl_2$), chlorine dioxide ($ClO_2$), ozone ($O_3$), and ultraviolet (UV) radiation are often used. Chlorination has long been a popular technique for disinfecting water because of its effectiveness and affordability. Nevertheless, some disinfection by-products (DBPs) such as trihalomethanes (THM) and halo acetic acids (HAA) may occur in treated water as a result of the disinfection process. There are about 600-700 distinct DBPs in treated water. These by-products have cytotoxic, mutagenic, teratogenic, and carcinogenic qualities, which put human health at danger. Hence, the current investigation aimed to explore the potential of phyto-synthesized $Fe_2O_3$ NPs at 2×MIC concentrations as an alternative disinfectant agent to combat certain waterborne pathogens.

Figure 13A:
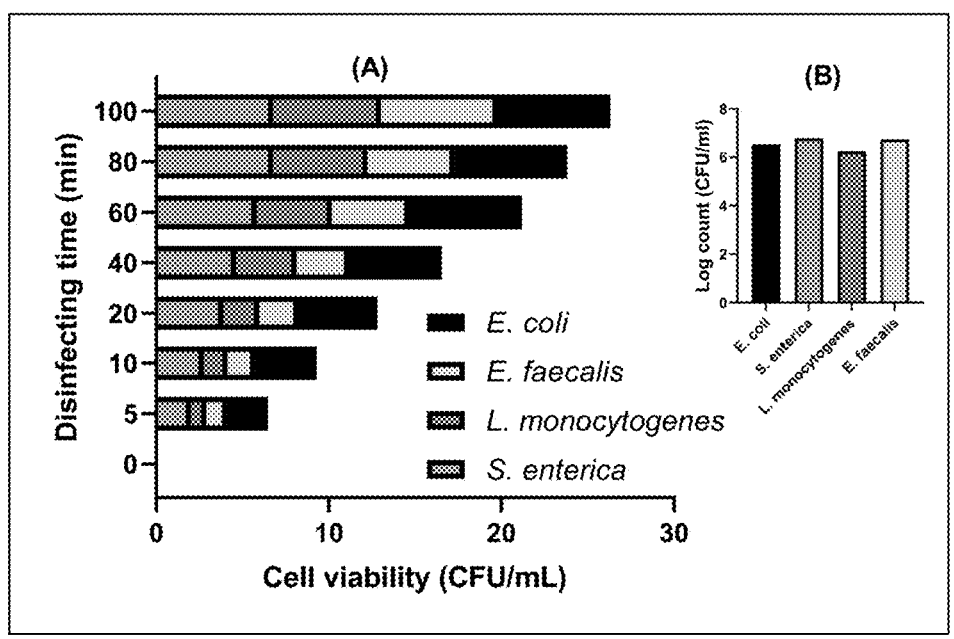
FIG. 13A is a graph showing effectiveness and performance of phyto-synthesized $Fe_2O_3$ NPs against various bacteria.
Figure 13B:
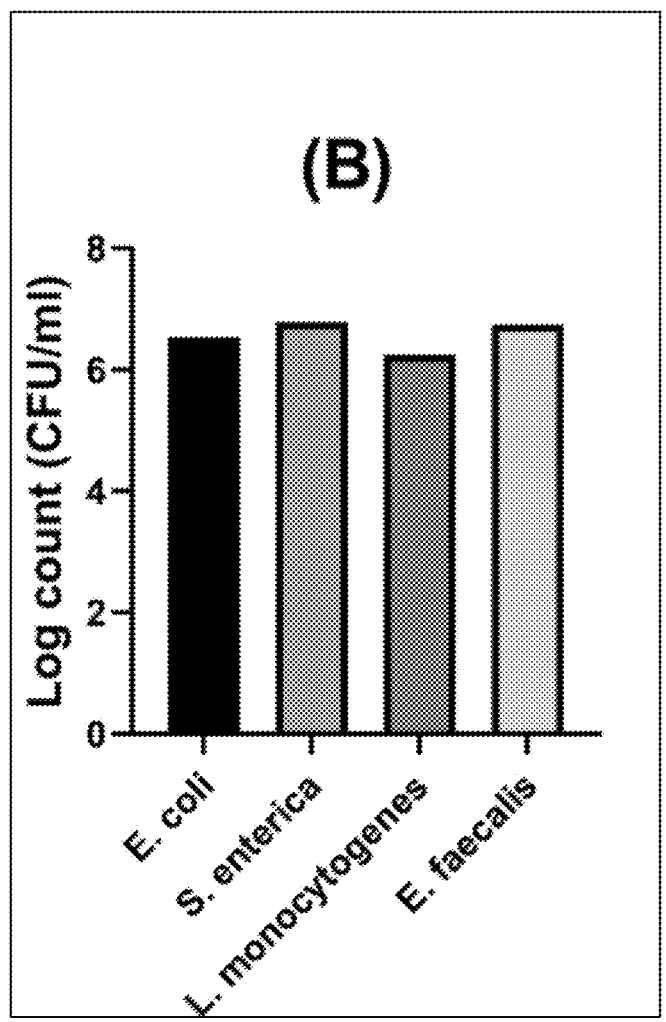
FIG. 13B is a graph showing initial log counts for each tested bacterial strain at the beginning of the experiment.

As shown in FIGS. 13A-13B, the phyto-synthesized $Fe_2O_3$ NPs at 2×MIC could prohibit 6-log viable cells of all tested bacteria after 100 minutes of disinfection. According to this research, the phyto-synthesized $Fe_2O_3$ NPs have potent antibacterial qualities and are capable of killing a significant portion of bacterial cells. A very efficient disinfection method is shown by the 6-log drop in viable cells, which shows a significant decrease in the bacterial population. There are several reasons why $Fe_2O_3$ NPs may stop the development of bacteria and lower the number of viable cells. First, it has been noted that $Fe_2O_3$ NPs naturally exhibit antibacterial qualities. By interacting with the bacterial cell membrane, the nanoparticles have the potential to damage it and cause cell death. $Fe_2O_3$ NPs are efficient against a wide variety of bacteria because of this method of action. Second, the plant-based synthesis method may have given the phyto-synthesized $Fe_2O_3$ NPs additional antibacterial characteristics. The antibacterial activity of the nanoparticles may be enhanced by phytochemicals found in the plant material used in their manufacture. These phytochemicals could work in concert with the $Fe_2O_3$ NPs to increase their capacity to stop the development of bacteria.

Statistical Analysis

The data obtained were analyzed using GraphPad Prism 8.1 software, and specific statistical analyses were conducted. For the time-kill kinetic and membrane damage assay, one-way ANOVA was utilized, while the biofilm removal assay employed a two-way ANOVA. The differences between treatments were confirmed using the Least Significant Difference (LSD) test at a significance level of 5% ($p<0.05$).

It is to be understood that the method of forming ferric oxide NPs and method of treating waste water is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A method of making a *Rosa rugosa* cv. *plena* (RP) ferric oxide ($Fe_2O_3$) nanoparticle (RP-$Fe_2O_3$ NP) composition, comprising:
   providing *Rosa rugosa* cv. *plena* (RP) extract;
   adding the RP extract to a solution of $FeCl_3$ to obtain a RP-$Fe_3Cl_4$ solution;

activating phytochemical compounds in the RP-$Fe_3Cl_4$ solution to obtain phyto-synthesized $Fe_2O_3$ nanoparticles in the RP-$Fe_3Cl_4$ solution; and centrifuging the phyto-synthesized $Fe_2O_3$ nanoparticles in the RP-$Fe_3Cl_4$ solution to provide a RP-$Fe_2O_3$ nanoparticle composition.

2. The method of claim 1, further comprising:

dessicating the RP-$Fe_2O_3$ nanoparticle composition to obtain a pulverized RP-$Fe_2O_3$ nanoparticle composition;

drying the RP-$Fe_2O_3$ nanoparticle composition;

calcinating the RP-$Fe_2O_3$ nanoparticle composition; and reducing the RP-$Fe_2O_3$ nanoparticle composition to a fine powder.

3. The method of claim 1, wherein the RP-$Fe_2O_3$ nanoparticle composition has an average particle size ranging from about 60 nm to about 73 nm.

4. The method of claim 1, wherein activating the phytochemical compounds in the RP extract comprises agitating the RP-$Fe_3Cl_4$ solution in a shaking water bath at a temperature of about 60° C. at about 160 rpm for about 4 hours.

5. The method of claim 1, wherein the phyto-synthesized $Fe_2O_3$ NPs are a brown color.

\* \* \* \* \*